United States Patent
Sato et al.

(10) Patent No.: US 7,805,068 B2
(45) Date of Patent: Sep. 28, 2010

(54) IMAGING APPARATUS

(75) Inventors: Daisuke Sato, Osaka (JP); Jun Minakuti, Osaka (JP); Hiroshi Tachibana, Osaka (JP); Tadayuki Miyamoto, Osaka (JP)

(73) Assignee: Sony Corporation, Tokyo (JP)

( * ) Notice: Subject to any disclaimer, the term of this patent is extended or adjusted under 35 U.S.C. 154(b) by 211 days.

(21) Appl. No.: 12/044,320

(22) Filed: Mar. 7, 2008

(65) Prior Publication Data
US 2008/0298797 A1   Dec. 4, 2008

(30) Foreign Application Priority Data
May 30, 2007   (JP)   ............. 2007-143316

(51) Int. Cl.
*G03B 13/02* (2006.01)
*G03B 3/00* (2006.01)
(52) U.S. Cl. ................. 396/373; 396/84; 396/121
(58) Field of Classification Search ............... 396/84, 396/121–123, 148, 150, 373–374, 382–384
See application file for complete search history.

(56) References Cited

U.S. PATENT DOCUMENTS 5,909,598 A * 6/1999 Kadohara ................. 396/296
6,850,700 B2 * 2/2005 Kazami ..................... 396/60

FOREIGN PATENT DOCUMENTS

| JP | 2001-133853 | | 5/2001 |
|---|---|---|---|
| JP | 2001-296584 | | 10/2001 |
| JP | 2002-268128 | | 9/2002 |
| JP | 2006-311126 | | 11/2006 |
| JP | 2006-317617 | | 11/2006 |
| JP | 2006311126 A | * | 11/2006 |
| JP | 2007-72286 | | 3/2007 |

* cited by examiner

*Primary Examiner*—W. B. Perkey
*Assistant Examiner*—Dennis Hancock
(74) *Attorney, Agent, or Firm*—Oblon, Spivak, McClelland, Maier & Neustadt, L.L.P.

(57) ABSTRACT

An imaging apparatus includes a viewfinder optical system that observes a subject image input from a photography optical system. The imaging apparatus also includes a transmissive member upon which is provided a line image indicating detection positions of photography supporting information relating to photography conditions, within a photography region. The photography conditions are at least one of setting information relating to a focus and setting information relating to an exposure. The imaging apparatus further includes an imaging device that acquires a photographed image relating to the subject image, the line image having been superimposed on the photographed image. In addition, the imaging apparatus includes a processing unit that corrects a part of the line image extracted from the line image shown in the photographed image, the part of the line image having been extracted corresponding to the photography conditions that have been set.

18 Claims, 12 Drawing Sheets

FIG. 9

|  |  | MF MODE | AF MODE | | | ME MODE | AE MODE | | |
|---|---|---|---|---|---|---|---|---|---|
|  |  |  | CENTER SPOT | WIDE | LOCAL |  | SPOT PHOTOMETRY | DIVISION PHOTOMETRY | CENTER-WEIGHTED AVERAGE PHOTOMETRY |
| FIRST LAYOUT LINES | LAYOUT LINE L1 | N | N | D | N | — | — | — | — |
|  | LAYOUT LINE L2 | N | N | D | N | — | — | — | — |
|  | LAYOUT LINE L3 | N | N | D | N | — | — | — | — |
|  | LAYOUT LINE L4 | N | N | D | N | — | — | — | — |
| SECOND LAYOUT LINES | LAYOUT LINE L11 | N | N | D | S | — | — | — | — |
|  | LAYOUT LINE L12 | N | N | D | S | — | — | — | — |
|  | LAYOUT LINE L13 | N | N | D | S | — | — | — | — |
|  | LAYOUT LINE L14 | N | N | D | S | — | — | — | — |
|  | LAYOUT LINE L15 | N | N | D | S | — | — | — | — |
|  | LAYOUT LINE L16 | N | N | D | S | — | — | — | — |
|  | LAYOUT LINE L17 | N | N | D | S | — | — | — | — |
|  | LAYOUT LINE L18 | N | N | D | S | — | — | — | — |
| THIRD LAYOUT LINE | LAYOUT LINE L19 | N | D | D | S | — | — | — | — |
| FOURTH LAYOUT LINE | LAYOUT LINE L51 | — | — | — | — | N | D | N | N |

D: DISPLAYED
N: NOT DISPLAYED (DELETED)
S: AFTER SPECIFICATION, THE ONE SPECIFIED LAYOUT LINE IS DISPLAYED

FIG. 10

| | TYPE OF LAYOUT LINE | ADDRESS INFORMATION |
|---|---|---|
| FIRST LAYOUT LINES | LAYOUT LINE L1 | (X1a, Y1a), (X1b, Y1b)... |
| | LAYOUT LINE L2 | (X2a, Y2a), (X2b, Y2b)... |
| | LAYOUT LINE L3 | (X3a, Y3a), (X3b, Y3b)... |
| | LAYOUT LINE L4 | . |
| SECOND LAYOUT LINES | LAYOUT LINE L11 | . |
| | LAYOUT LINE L12 | . |
| | LAYOUT LINE L13 | . |
| | LAYOUT LINE L14 | . |
| | LAYOUT LINE L15 | . |
| | LAYOUT LINE L16 | . |
| | LAYOUT LINE L17 | . |
| | LAYOUT LINE L18 | (X18a, Y18a), (X18b, Y18b)... |
| THIRD LAYOUT LINE | LAYOUT LINE L19 | (X19a, Y19a), (X19b, Y19b)... |
| FOURTH LAYOUT LINE | LAYOUT LINE L51 | (X51a, Y51a), (X51b, Y51b)... |

IMAGING APPARATUS

CROSS REFERENCES TO RELATED APPLICATIONS

The present invention contains subject matter related to Japanese Patent Application JP 2007-143316 filed in the Japanese Patent Office on May 30, 2007, the entire contents of which are incorporated herein by reference.

BACKGROUND OF THE INVENTION

1. Field of the Invention

The present invention relates to an imaging apparatus.

2. Description of the Related Art

As of recent, there has been proposed an imaging apparatus in the field of digital single-lens reflex (DSLR) cameras, provided with a so-called electronic viewfinder function wherein a photography image relating to a subject to be imaged before actual photographing (also called (live view image) is displayed on a liquid crystal display. Imaging apparatuses having such an electronic viewfinder function are provided with an imaging device different from the imaging device used for the main photography image within the optical viewfinder, and acquire a subject image formed on a focusing plate, which is dynamically displayed on the liquid crystal display. With an optical viewfinder, layout lines indicating distance measurement range and/or photometry range or the like are superimposed, so with the above imaging apparatus, the layout lines are displayed on the liquid crystal monitor along with the subject image.

However, having such layout lines displayed on the live view image deteriorates the ability of the photographer (also referred to as "user") to visually recognize the subject image, and the user may find the presence of the layout lines irritating.

Now, there has been proposed a technique wherein correction data corresponding to the spectral transmissivity of the layout lines is provided beforehand, and the image portions of the layout lines are erased based on this correction data (see Japanese Unexamined Patent Application Publication No. 2006-311126)

Also, there has been proposed a technique wherein a first display mode, in which the layout lines can be seen, and a second display mode, in which the layout lines can be erased, are selectable, and in the event of the second display mode being selected, the layout lines are erased from the photographed image and the photographed image is displayed on the monitor with the layout lines erased (see Japanese Unexamined Patent Application Publication No. 2001-296584).

SUMMARY OF THE INVENTION

However, with the technique described in Japanese Unexamined Patent Application Publication No. 2006-311126, there is the need to measure spectral transmissivity for each imaging apparatus at the time of manufacturing, requiring extra steps in the manufacturing process. Also, erasing the layout lines means that information which is useful for photography is all lost.

Further, with the technique described in Japanese Unexamined Patent Application Publication No. 2001-296584, in the event that a second display mode capable of erasing the layout lines, information which is useful for photography is all lost.

There has been recognized a need to provide an imaging apparatus capable of displaying useful layout information in an efficient manner.

An imaging apparatus according to an embodiment of the present invention includes: a viewfinder optical system configured to observe a subject image input from a photography optical system; a transmissive member upon which is provided a line image indicating detection positions of photography supporting information relating to photography conditions, within a photography region; an imaging device configured to acquire a photographed image relating to the subject image upon which the line image has been superimposed; and a line image correcting unit for correcting a part of the line image extracted from the line image shown in the photographed image, the part of the line image having been extracted corresponding to the photography conditions that have been set.

According to this configuration, a line image shown in the photographed image is corrected, so useful layout information with regard to photography conditions can be efficiently displayed.

BRIEF DESCRIPTION OF THE DRAWINGS

FIG. 9 is a diagram illustrating the relation between photography conditions and each of the layout lines;

FIG. 10 is a diagram illustrating the address information of each of the layout lines;

DESCRIPTION OF THE PREFERRED EMBODIMENTS

Embodiments of the present invention will now be described with reference to the drawings.

Configuration

Figure 1:
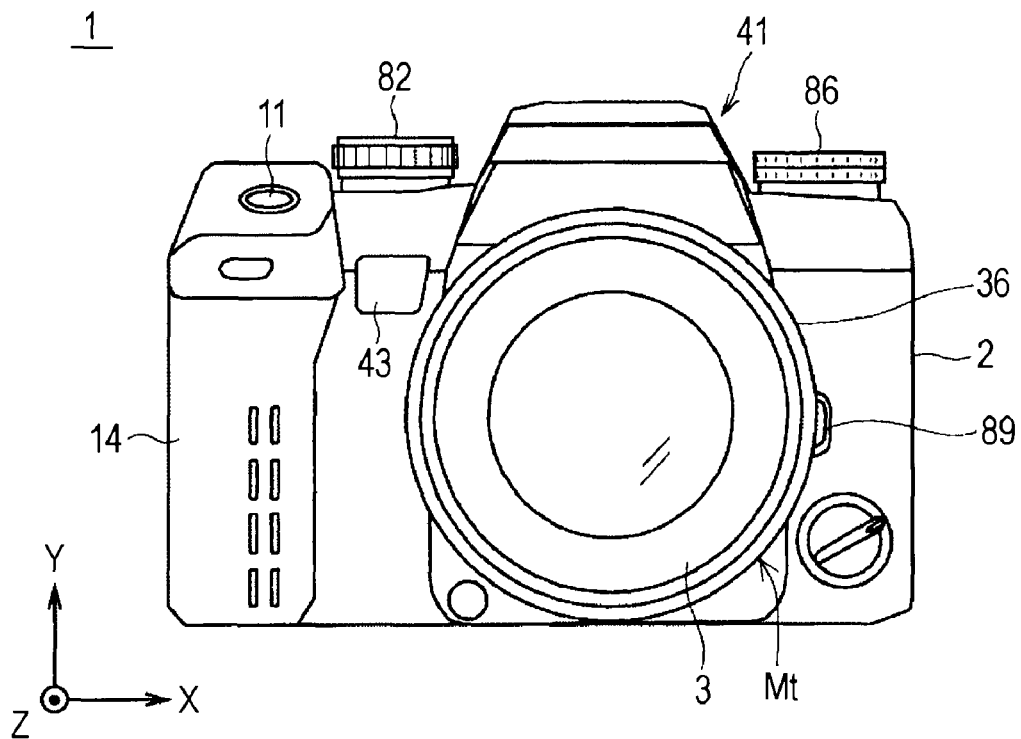
FIG. 1 is a frontal view of an imaging apparatus according to an embodiment of the present invention.
Figure 2:
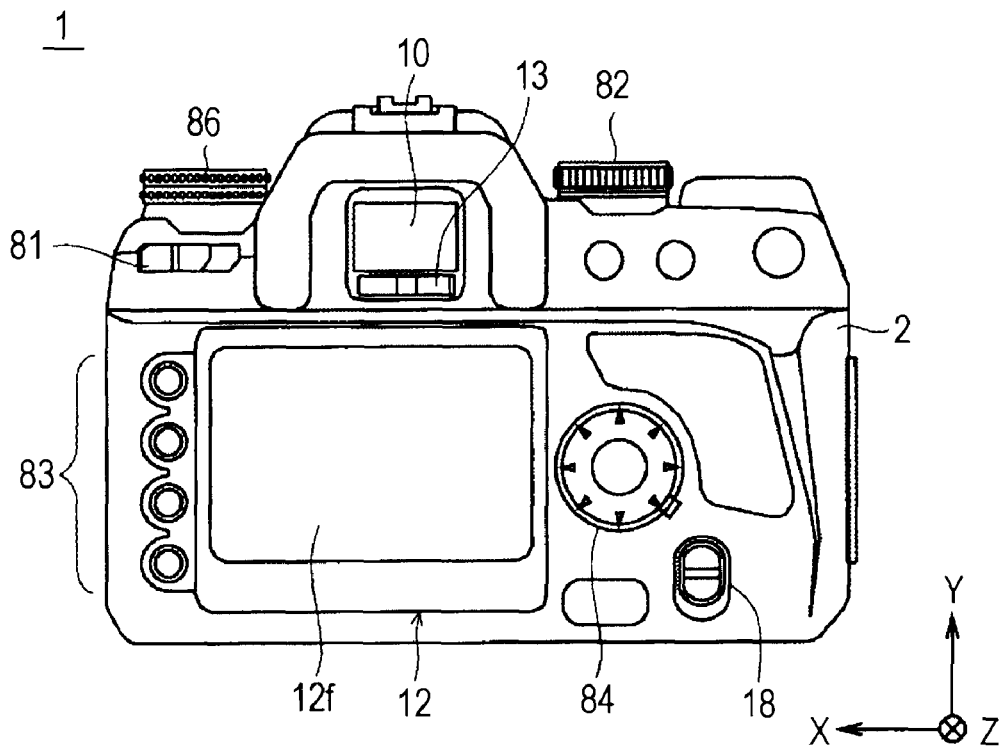
FIG. 2 is a rear view of the imaging apparatus according to an embodiment of the present invention.

FIGS. 1 and 2 are diagrams illustrating an external configuration of an imaging apparatus 1 according to an embodiment of the present invention, wherein FIG. 1 is a frontal view thereof, and FIG. 2 is a rear view thereof. The imaging apparatus 1 is configured as a single-lens reflex type digital camera with interchangeable lenses.

As shown in FIG. 1, the imaging apparatus 1 has a camera main unit (camera body) 2. An interchangeable photography lens unit (interchangeable lens) 3 is detachably mounted to the camera main unit 2. The photography lens unit 3 is primarily includes a lens barrel 36, and a photography optical system 37 configured of a lens group disposed within the lens barrel 36, an aperture 16 (see FIG. 3) and so forth. The lens group 37 includes a focusing lens which changes the focal position by moving along the optical axis.

The cameral main unit 2 has provided, at the generally center portion of the front face thereof, a ring-shaped mount portion Mt to which the photography lens unit 3 is mounted, and a release button 89 for detaching the photography lens unit 3 provided near the ring-shaped mount portion Mt.

Also, the camera main unit 2 has a mode setting dial 82 provided on the upper left portion of the front face thereof, and a control value setting dial 86 provided on the upper right portion of the front face thereof. Operating the mode setting dial 82 allows the user to perform setting operations (switchover operations) of various photography modes (portrait photography mode, scenery photography mode, full-auto photography mode, etc.), playback modes for playing back images that have been taken, communication modes by which to exchange data with external devices, and so on). Operating the control value setting dial 86 allows the user to set control values for the various photography modes.

Further, the camera main unit 2 has a grip 14 on the left end portion of the front face for the photographer (user) to group. A release button 11 for instructing starting of exposure is provided on the upper face of the grip 14. A battery storage chamber and card storage chamber are provided within the grip 14m with four AA batteries for example being stored as the power source of the camera, and a memory card 90 (see FIG. 3) being detachably stored in the card storage chamber for recording image data.

The release button 11 is a two-stage detection button capable of detecting two stages, one being a half-pressed state (S1 state) and a full-pressed state (S2 state). Upon the release button 11 being half-pressed and entering the S1 state, preparatory operations (e.g., AF control operations, AE control operations, etc.) are made for acquiring a still image of the subject for recording (i.e., a main photography image). Also, upon the release button 11 being further pressed and entering the S2 state, photography operations of the main photography image (a series of operations wherein exposure operations relating to the subject (light image of the subject) are performed using an imaging device (also called "main imaging device") 5, which will be described later, and image signals obtained by the exposure operations are subjected to predetermined image processing) are executed.

Figure 4:
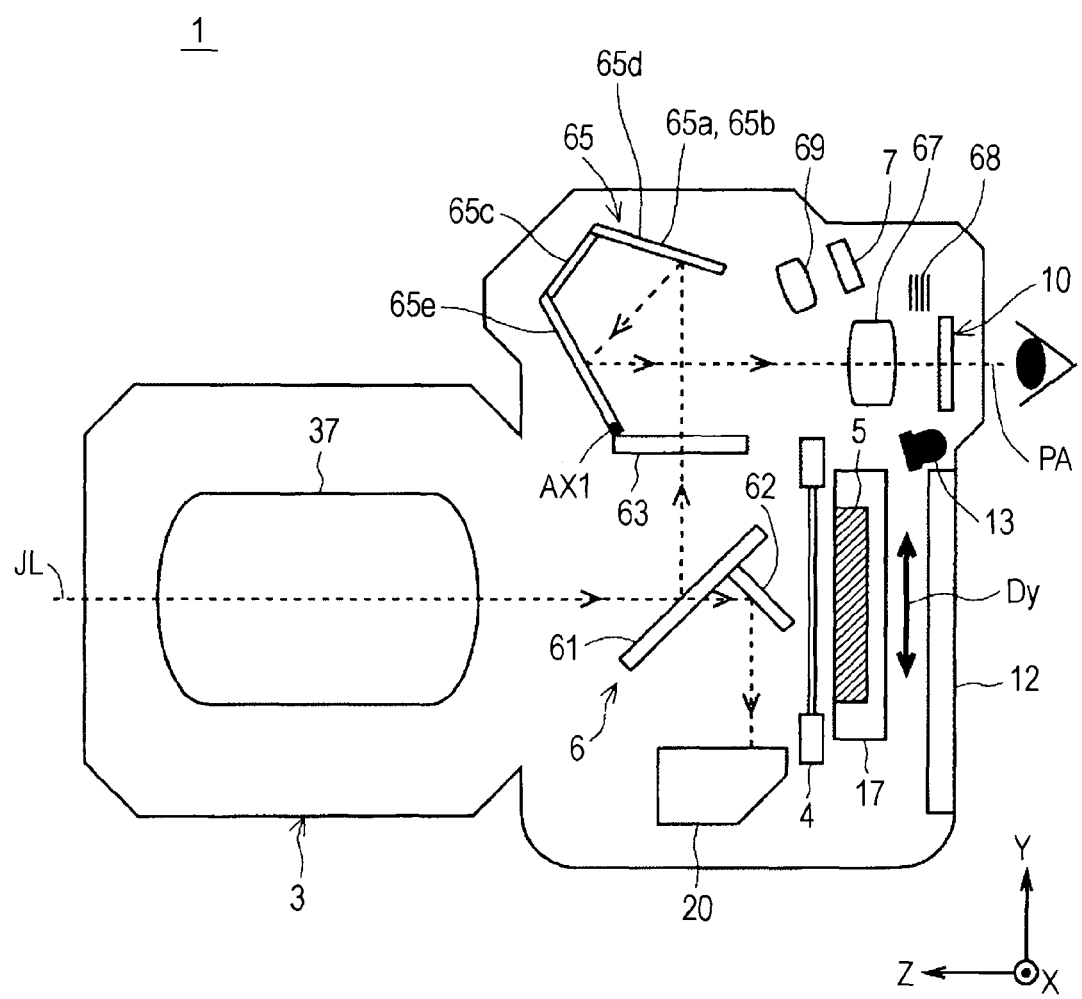
FIG. 4 is a cross-sectional view of the imaging apparatus.

In FIG. 2, a viewfinder window (eyepiece) 10 is provided above the generally center portion on the rear face of the camera main unit 2. The photographer can visually recognize the subject image optically guided in from the photography lens unit 3 as shown in FIG. 4 by looking through the viewfinder window 10, to compose the picture. That is to say, the photographer can compose the picture using an optical viewfinder, wherein the subject image passes through the photography lens unit 3 to the viewfinder window 10.

Note that with the imaging apparatus 1 according to the present embodiment, the picture can be composed using a live view function wherein a live view image (preview image) of the subject image before the main photography is displayed on the back monitor 12, as described in detail later. This live view function is a function wherein a time-series of images of the subject, acquired with an imaging device (also called "sub imaging device") 7 (see FIG. 4) is displayed sequentially on the back monitor 12. In other words, images of the subject are displayed on the back monitor 12 as if they were a moving image. Switching between composing of a picture using the above live view function (electronic viewfinder) and composing of a picture using the optical viewfinder is performed by the photographer sliding a display switchover switch 18 to be described later.

Also, an eyepiece detection sensor 13 is provided below the viewfinder window 10. The eyepiece detection sensor 13 is for detecting whether or not there is a nearby object, thereby detecting whether or not the photographer is using the viewfinder.

In FIG. 2, at the generally center portion of the rear face of the camera main unit 2 is provided a back monitor 12 having a display screen 12f capable of displaying images. The back monitor 12 is configured of a color liquid crystal display (LCD), for example. The back monitor 12 can display a menu screen for setting photography conditions and so forth, displaying reproduced photography images recorded in the memory card 90 in playback mode, and so forth.

A main switch 81 is provided on the upper left portion of the back monitor 12. The main switch 81 is configured of a two-point slide switch, with the power source being turned off upon the contact point being set to the "OFF" position at the left side, and the power source being turned on upon the contact point being set to the "ON" position at the right side.

A direction selection key 84 is provided to the right side of the back monitor 12. The direction selection key 84 has a circular operation button, capable of detection of operations in each of the two vertical directions (up, down), the two horizontal directions (left, right), and the four diagonal directions (upper left, upper right, lower left, lower right). The direction selection key 84 is also capable of detecting, in addition to pressing operations in the above eight directions, pressing operations of a center push button.

A display switchover switch 18 is provided to the lower right of the direction selection key 84. This display switchover switch 18 is configured of a two-point slide switch, with an OVF mode being selected upon the contact point being set to the "optical" position at the upper side, so that a subject image is displayed within the field of the optical viewfinder. Thus, the photographer can perform picture composing operations (also called "framing") by visually recognizing the display within the optical viewfinder through the viewfinder window 10.

Also, an EVF mode is selected upon the contact point of the display switchover switch 18 being set to the "LCD" position at the lower side, so that a live view image of the subject image is displayed on the back monitor 12 in moving image fashion. Thus, the photographer can perform framing by visually recognizing the live view image displayed on the back monitor 12.

Provided on the left side of the back monitor 12 is a setting button group 83 made up of multiple buttons for setting menu screens, deleting images, and so forth. Cooperative operation of predetermined buttons included in the setting button group 83 and the direction selection key 84 while viewing a mode setting screen displayed on the back monitor 12 allows the photographer to switch between a manual photography mode wherein photography conditions are manually settable, and an automatic photography mode wherein photography conditions are automatically set. Specifically, settings of various types of photography conditions are made, such as regarding switching between an automatic exposure (AE) mode wherein either aperture or shutter speed has priority or the like, and a manual exposure (ME) mode, switching between auto focus (AF) mode and manual focus (MF) mode, and so on.

Functions

Figure 3:
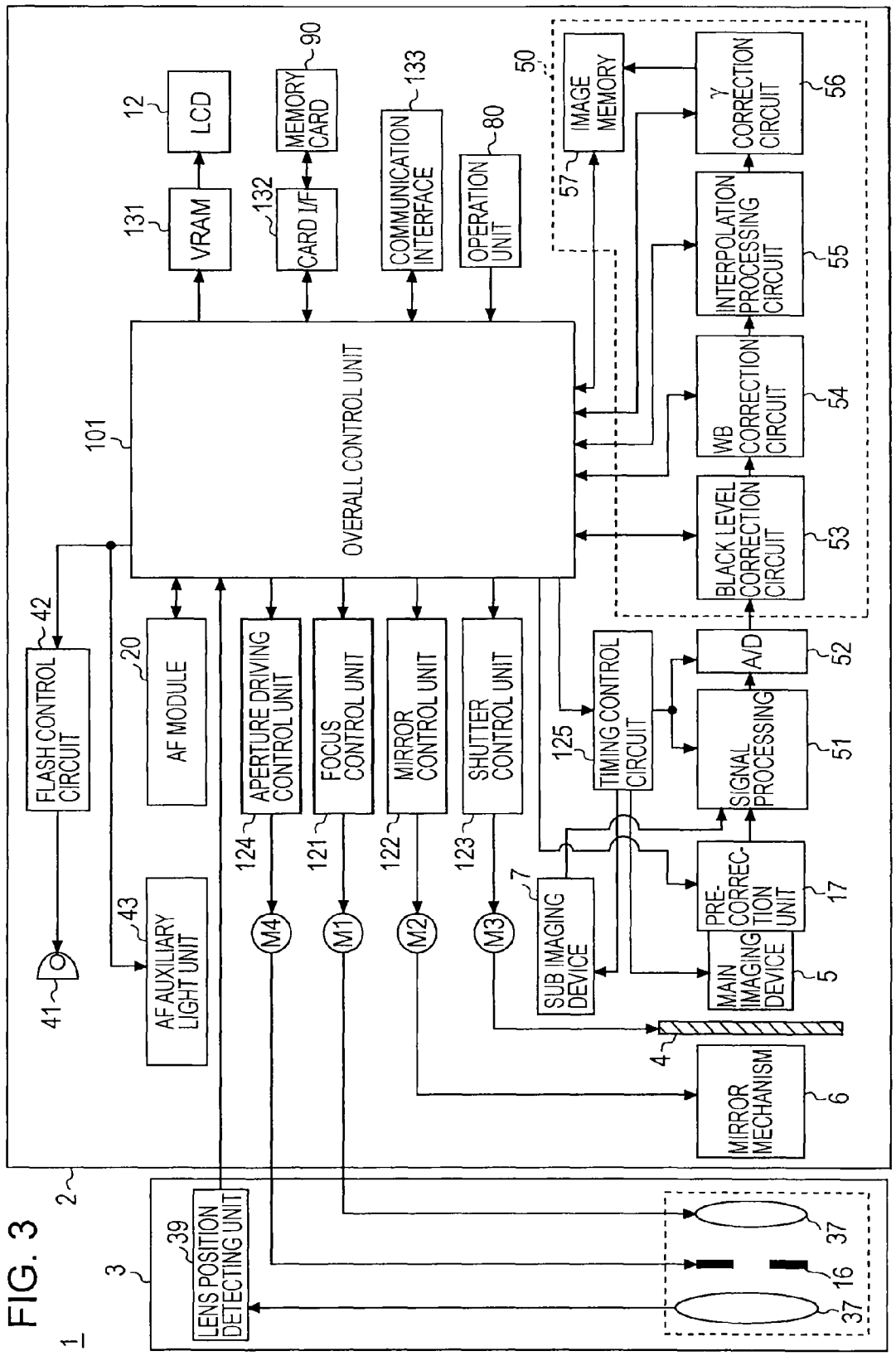
FIG. 3 is a block diagram illustrating the functional configuration of the imaging apparatus.

Next, an overview of functions of the imaging apparatus 1 will be described with reference to FIG. 3. FIG. 3 is a block diagram illustrating the functional configuration of the imaging apparatus 1.

As shown in FIG. 3, the imaging apparatus 1 has an operating unit 80, central control unit 101, focus control unit 121, mirror control unit 122, shutter control unit 123, aperture driving control unit 124, timing control unit 125, digital signal processing circuit 50, and so forth.

The operating unit 80 is configured of various buttons including the release button 11 (see FIG. 1), various switches, and so forth. The central control unit 101 responds to input operations made by the photographer at the operating unit 80 so as to realize the various actions thereof.

The central control unit 101 is configured as a microcomputer, having primarily a CPU, RAM, ROM, and so forth. The central control unit 101 reads out programs stored within the ROM, and realizes the functions thereof by executing the program at the CPU. For example, the central control unit 101 acts cooperatively with an AF module 20 and focus control unit 121 and so forth to perform focusing control operations wherein the position of the focus lens is controlled. Note that the AF module 20 is capable of detecting the focusing state of the subject by a focusing state detection technique such as phase-contrast or the like, using the light fro the subject that has been guided by a mirror mechanism 6 (see FIG. 4).

The focus control unit 121 moves a focus lens included in a lens group 37 of the photography lens unit 3 by generating control signals based on signals input from the central control unit 101 and driving a motor M1. The position of the focus lens is detected by a lens position detecting unit 39 of the photography lens unit 3, and data indicating the position of the focus lens is sent to the central control unit 101. Thus, the focus control unit 121, central control unit 101, and so forth, control movement of the focus lens along the optical axis.

The mirror control unit 122 controls state switchover between a state wherein the mirror mechanism 6 is retracted from the optical path 6 (mirror-up state) and a state wherein the mirror mechanism 6 shields the optical path 6 (mirror-down state). The mirror control unit 122 switches over between the mirror-up state and the mirror-down state by generating control signals based on signals input from the central control unit 101 and driving a motor M2.

The shutter control unit 123 controls opening and closing of a shutter 4 by generating control signals based on signals input from the central control unit 101 and driving a motor M3.

The aperture driving control unit 124 controls the aperture diameter of the aperture 16 provided to the photography lens unit 3 by generating control signals based on signals input from the central control unit 101 and driving a motor M4.

The timing control circuit 125 performs timing control of a main imaging device 5 and so forth. The main imaging device 5 (e.g., a CCD) converts the subject image received via the lens group 37 into electrical signals by photo-electrical conversion, and generates image signals relating to the main photography image (image signals for recording). That is to say, the main imaging device 5 serves as an imaging sensor for acquiring an image relating to the subject at the time of main photography.

In response to driving control signals (accumulation start signals and accumulation end signals) input from the timing control circuit 125, the main imaging device 5 performs exposure (charge accumulation by photo-electrical conversion) of the subject image formed on the reception face thereof, so as to generate image signals relating to the subject image. Also, in response to read control signals input from the timing control circuit 125, the main imaging device 5 outputs the image signals to a signal processing unit 51. Timing signals (synchronizing signals) from the timing control circuit 125 are also input to the signal processing unit 51 and to an A/D (analog/digital) conversion circuit 52.

The main imaging device 5 is held is as to be movable two-dimensionally in a plane orthogonal to the optical axis of the photography lens unit 3, by way of a shaking correction unit 17 (FIG. 4). Specifically, the position of the main imaging device 5 can be changed in a direction Dy parallel to the Y axial direction (FIG. 4) and a direction Dx parallel to the X axial direction by a yaw-direction actuator and a pitch-direction actuator (not shown) provided to the shaking correction unit 17. The central control unit 101 calculates the shaking direction and shaking amount based on shaking detection signals from a shaking detection sensor (not shown), correction control signals are generated based on the calculated direction and amount of shaking which are output to the shaking correction unit 17, and the main imaging device 5 is shifted in a direction whereby shaking is cancelled out.

The image signals acquired at the main imaging device 5 are subjected to analog signal processing at the signal processing unit 51, and the image signals following the analog signal processing are converted into digital image data (image data) by the A/D conversion circuit 52. The image data is input to the digital signal processing circuit 50.

The digital signal processing circuit 50 subjects the image data input from the A/D conversion circuit 52 to digital signal processing, and generates image data relating to the photography image. The digital signal processing circuit 50 has a black level correction circuit 53, WB correction circuit 54, interpolation processing circuit 55, γ correction circuit 56, and image memory 57.

The black level correction circuit 53 corrects the black level of each pixel data making up the image data output from the A/D conversion circuit 52 to a standard black level. The WB correction circuit 54 adjusts the white balance of the image. The interpolation processing circuit 55 erases latter-described line images within the photography image displayed on the back monitor 12 in moving image fashion at the time of using the electronic viewfinder which will be described later. This erasing is performed by interpolation processing. The γ correction circuit 56 performs gradient conversion of the photographed image. The image memory 57 is image memory capable of high-speed access, for temporarily storing the generated image data, and has capacity sufficient for storing multiple frames of image data.

At the time of main photography, the image data temporarily stored in the image memory 57 is subjected to image processing (compression processing, etc.) at the central control unit 101 as appropriate, and then is stored in the memory card 90 via the card interface 132.

Also, the image data temporarily stored in the image memory 57 is transferred to VRAM 131 as appropriate by the central control unit 101, and an image based on the image data is displayed on the back monitor 12. Thus, a confirmation display (after view) for confirming the photographed image, and a playback display for reproducing images photographed in the past, is realized.

Also, the imaging apparatus 1 further has another imaging device other than the main imaging device 5, the aforementioned sub imaging device 7. The sub imaging device 7 functions to acquire images of the subject prior to the main photography, serving as an imaging device for acquisition of the so-called live view images (i.e., as an electronic viewfinder imaging device).

The sub imaging device 7 has a configuration similar to that of the main imaging device 5. Note, however, that the sub imaging device 7 only needs to have resolution sufficient for generating live view image signals (moving image signals), and normally is configured with fewer pixels than the main imaging device 5.

The image signals acquired at the sub imaging device 7 are subjected to the same signal processing as the image signals acquired at the main imaging device 5. That is to say, the image signals acquired at the sub imaging device 7 are subjected to analog signal processing at the signal processing unit 51, and are converted into digital image data by the A/D conversion circuit 52, then input to the digital signal processing circuit 50, and stored in the image memory 57.

Also, the time-sequence acquired at the sub imaging device 7 and stored in the image memory 57 is transferred to VRAM 131 as appropriate by the central control unit 101, and images based on the time-sequence image data are displayed on the back monitor 12. Thus, a display (live view) for composing the picture is realized.

Further, the imaging apparatus 1 has a communication interface 133, whereby the imaging apparatus 1 is capable of data communication with a device (e.g., a personal computer) with which it is connected.

Also, the imaging apparatus 1 has a flash 41, flash control circuit 42, and AF auxiliary light 43. The flash 41 is a light source used when the brightness of the subject is insufficient, or the like. Whether or not the flash is lit, and if lit, for how long, is determined by the flash control circuit 42 and the central control unit 101 and so forth. The AF auxiliary light 43 is an auxiliary light source for AF. Whether or not the AF auxiliary light 43 is lit, and if lit, for how long, is determined by the central control unit 101 and so forth.

Composition Determining Operations

Next, photography operations including composition determining operations with the imaging apparatus 1 will be described. As described above, with the imaging apparatus 1, pictures can be composed using the optical viewfinder (abbreviated as "OVF"), or using the electronic viewfinder (abbreviated as "EVF") wherein continuous image display (live view) based on images sequentially acquired at the sub imaging device 7 before main photography is performed on the display screen 12f.

Figure 5:
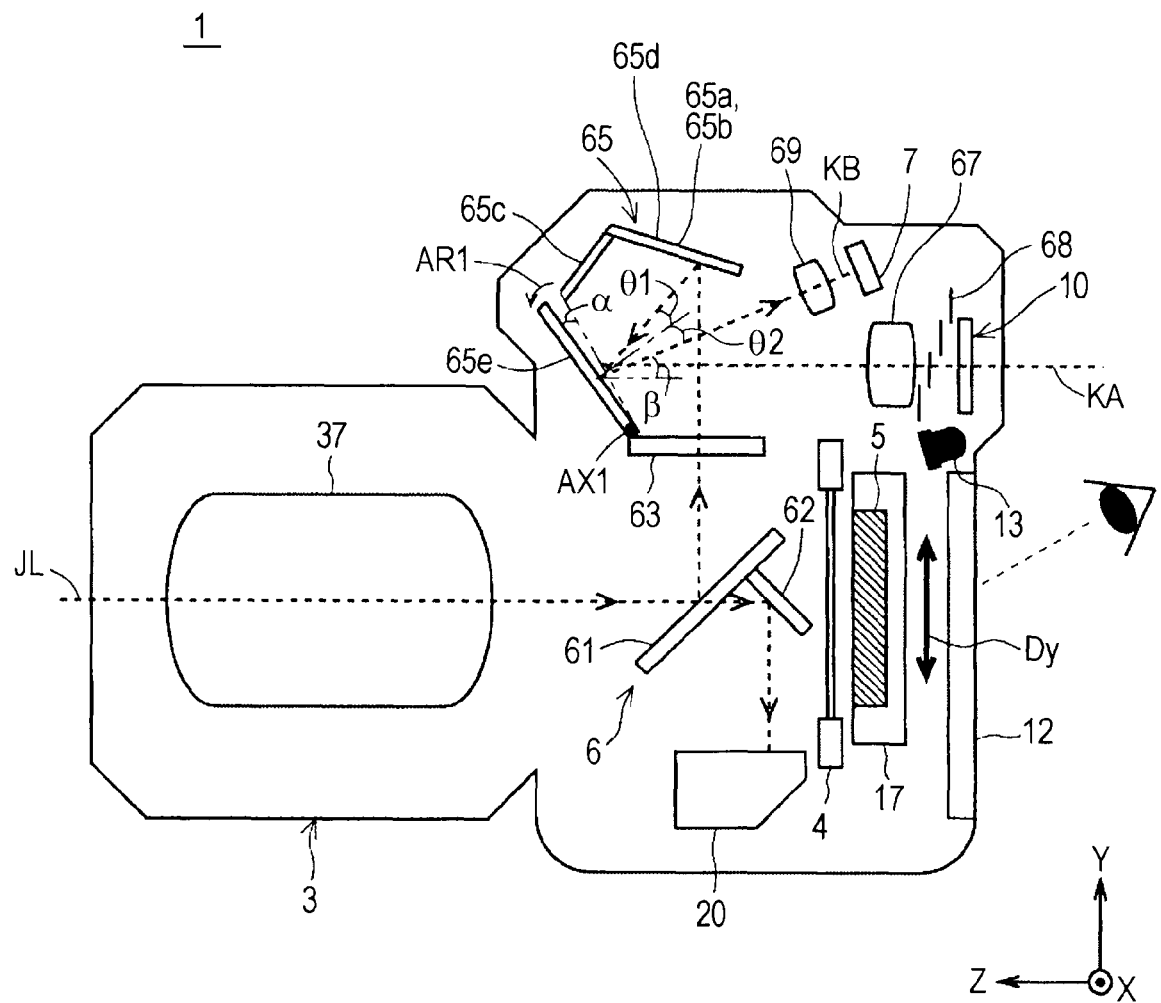
FIG. 5 is a cross-sectional view of the imaging apparatus.

FIGS. 4 and 5 are cross-sectional view of the imaging apparatus 1, wherein FIG. 4 illustrates composition determining operations using the optical viewfinder, and FIG. 5 illustrates composition determining operations using the electronic viewfinder.

As shown in FIG. 4, the mirror mechanism 6 is provided on the optical axis JL relating to the photography lens unit 3. The mirror mechanism 6 has a main mirror 61 (main reflecting face) for reflecting light from the photography optical system upwards. Part or all of the main mirror 61 is configured as a half mirror, transmitting a part of the light from the photography optical system. Also, the mirror configuration 6 also has a sub mirror 62 (sub reflecting face) for reflecting light which has transmitting the main mirror 61 downwards. The light reflected downwards by the sub mirror 62 is guided to the AF module 20, and is used for phase-contrast AF operations.

In the photography mode, the mirror configuration 6 is placed in the mirror-down state until the release button 11 goes to the full-pressed state S2, i.e., remains in the mirror-down state while the photographer is determining composition (see FIGS. 4 and 5). The subject image from the photography lens unit 3 at this time is reflected upwards from the main mirror 6 and is input to a pentaprism mirror 65 as an observation light flux. The pentaprism mirror 65 has multiple mirrors (reflecting faces), and functions to adjust the orientation of the subject image. The path of the observation light flux after entering the pentaprism mirror 65 depends on which of the above methods (i.e., optical viewfinder or electronic viewfinder) is used to compose the picture, which will be described later, and the picture can be composed with the method which the photographer has selected.

Upon the release button 11 being full-pressed that the state going to state S2, the mirror mechanism 6 is driven to the mirror-up state, and exposure operations start. Operations for acquiring the recording still image (also called "main photography image") of the subject (i.e., operations at the time of exposure) are the same regarding which of the above methods (i.e., optical viewfinder or electronic viewfinder) has been used to compose the picture.

Description will now be made regarding the operations in each of the methods used to compose the picture.

Composition Determining Operations with Optical Viewfinder

Figure 6:
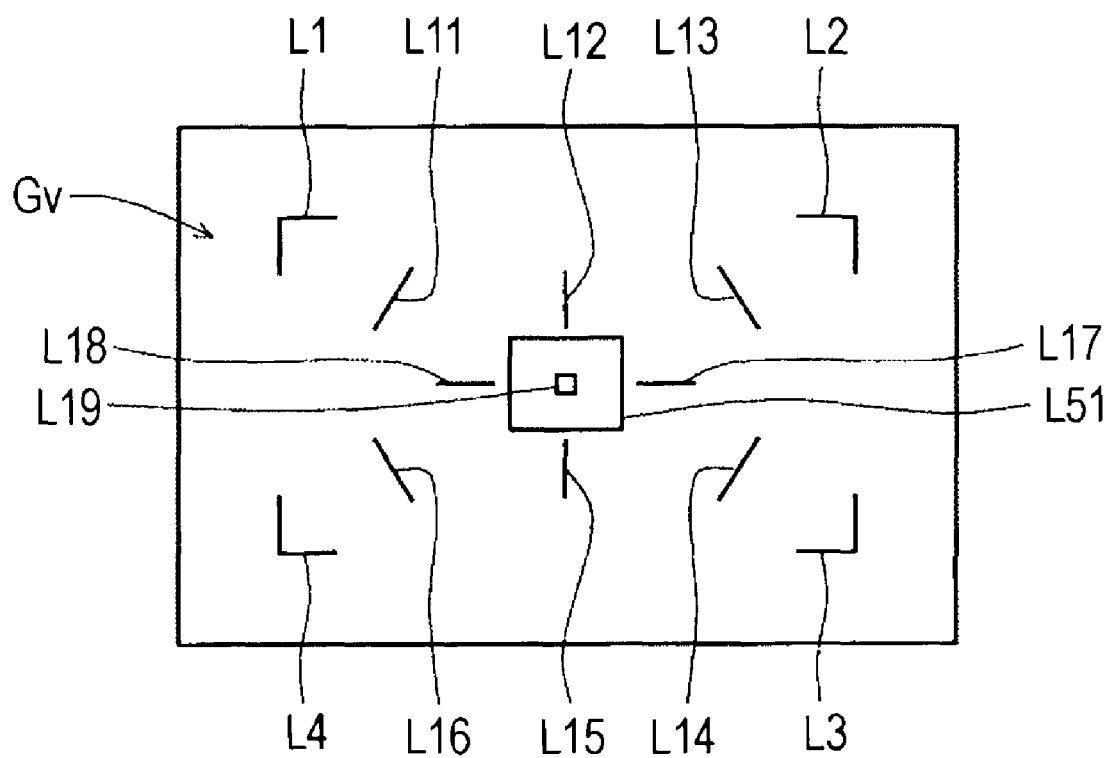
FIG. 6 is a diagram illustrating a line image projected on the viewfinder window.

First, description will be made regarding composition determining operations using the optical viewfinder. FIG. 6 is a diagram illustrating a line image Gv projected on the viewfinder window 10.

As shown in FIG. 4, the main mirror 61 and sub mirror 62 of the mirror mechanism 6 are placed on the optical path of the subject image from the photography lens unit 3, whereupon the subject is guided to the viewfinder window 10 by the main mirror 61 and pentaprism mirror 65 and eyepiece lens 67. Thus, the viewfinder optical system including the main mirror 61 and pentaprism mirror 65 and eyepiece lens 67 is capable of guiding the observation light flux, which is a light flux from the photography optical system and has been reflected off of the main mirror 61, to the viewfinder window 10. In other words, the optical viewfinder is capable of guiding subject light which has passed through the photography lens to the viewfinder window 10, following the optical path KA (the dotted lines in FIG. 4).

In more detail, light from the photography lens unit 3 is reflected at the main mirror 61 so that the path thereof changes upwards, is imaged on an focusing plate 63, and passes through the focusing plate 63. The light which has passed through the focusing plate 63 then further changes the path thereof at the pentaprism mirror 65, then further passes through the eyepiece lens 67 and heads toward the viewfinder window 10 (optical path KA in FIG. 4). The subject image which has passed through the viewfinder window 10 is visually recognized by the photographer (observer), that is to say, the photographer can confirm (observe) the subject image by looking into the viewfinder window 10.

Now, pentaprism mirror 65 is two mirror faces 65a and 65b formed in a shape like a triangular roof, known as a "roof mirror" or "Dach Mirror", a face 65c fixed as to the roof-shaped faces 65a and 65b, and a further mirror (reflecting face) 65e. Also, the two mirror faces 65a and 65b formed in a shape like a triangular roof are integrally formed by plastic molding, as a single article 65*d*. Light which has been reflected off of the main mirror 61 and has changed the path thereof upwards is reflected at the roof mirror 65*a* and 65*b* and horizontally inverted, and is also vertically inverted by being reflected off of the mirror 65*e*, and it is in this state that the light image reaches the eye of the photographer. The light image is horizontally and vertically inverted by the photography lens unit 3, and further horizontally and vertically inverted by the pentaprism mirror 65. Thus, the photographer can observe the subject image which is aligned so as to be vertically and horizontally the same as with the actual subject, in the viewfinder window 10.

Also, with the optical viewfinder, the line image (also called "line drawing" or "target mark") Gv, indicating the focus position and/or photometry position as to the subject, as shown in FIG. 6 for example, is projected on the viewfinder window 10, superimposed on the subject image. The line image Gv is configured of multiple line images corresponding to each of multiple later-described photography conditions relating to focusing and/or exposure. Specifically, the line image Gv is configured of four L-shaped lines L1 through L4 which represent a wide-focus frame, eight line segments L11 through L18, a square line L19 representing a spot focus frame, and a square line L51 representing a spot photometry region. Note that the line image Gv represents the focus position and the photometry position and so forth in the photography region, and accordingly can also be said to be representing the position of detection (acquisition) of photography support information relating to photography conditions (this position may be called "information detection position" or simply "detection position").

The imaging apparatus 1 has focus detection sensors of the AF module 20 provided at a total of nine locations corresponding to the line segments L11 through L18 indicating the local focus frame and the line L19 indicating the spot focus frame, with the subjected being focused upon using these nine focus detection sensors. For example, in the event that "wide" is selected as the selection pattern (AF area pattern) of the AF area (also called "focus area"), focusing is executed using sensors automatically selected from the nine focus detection sensors within the wide focus frame.

AF area selection patterns with the imaging apparatus 1 include "center spot", "wide", and "local", with selection (validation) of the AF area pattern being performed by button operations using the direction selection key 84, setting button group 83, or the like.

With "center spot", the layout line L19 representing the spot focus frame (also called "third layout line") is fixedly specified as the AF area (see FIG. 6). With "wide", one layout line of the layout lines L11 through L18 representing the local focus frame (also called "second layout lines") and the third layout line L19 is automatically specified (determined) as the AF area. With "local", one layout line of the second layout lines L11 through L18 and the third layout line L19 is selectively specified as the AF area.

Also, in the event that spot photometry is selected as the mode for measuring the brightness of the subject (also called "photometry mode"), photometry is performed within the spot photometry region at the center surrounded by the square line L51.

Note that photometry modes with the imaging apparatus 1 include division photometry, center-weighted average photometry, and spot photometry, with selection (validation) of the photometry mode being performed by button operations using the direction selection key 84, setting button group 83, or the like. With division photometry, the photography region is divided into small regions and photometry is performed in each of the divided regions. With center-weighted average photometry, the overall brightness of the photography area is measured on average with the center portion of the photography region weighted. With spot photometry, photometry is performed at the spot photometry region at the center of the photography region as described above.

The line image Gv such as described above is drawn by drawing the layout lines on the upper face of the focusing plate 63 configured as a transmissive member. That is to say, the line image Gv, which is superimposed on the subject image and is guided to the viewfinder window 10, is represented on the focusing plate 63 provided on the optical path KA over which the subject light which has passed through the photography lens is guided to the viewfinder window 10.

Also, the light which has passed through the main mirror 61 is reflected downwards by the sub mirror 62 and is cast into the AF module 20. The AF module 20 and the focus control unit 121 and so forth use the light from the main mirror 61 and sub mirror 62 to realize AF actions.

Composition Determining Operations with Electronic Viewfinder

Next, description will be made regarding composition determining operations using the electronic viewfinder. As shown in FIG. 5, in this case as well, the main mirror 61 and sub mirror 62 of the mirror mechanism 6 are placed on the optical path of the subject image from the photography lens unit 3. Light from the photography lens unit 3 is reflected at the main mirror 61 so that the path thereof changes upwards, is imaged on an focusing plate 63, and passes through the focusing plate 63.

What differs with the composition determining operations with the electronic viewfinder is that the light making up the subject image, which has passed through the focusing plate 63, then further changes the path thereof at the pentaprism mirror 65, then further passes through an imaging lens 69 (imaging optical system) and is re-imaged on the imaging face of the sub imaging device 7 (see optical path KB in FIG. 5). The light which has been reflected off of the main mirror 61 and has changed the path thereof upwards is reflected at the roof mirror 65*a* and 65*b* and horizontally inverted, and is also vertically inverted by being reflected off of the mirror 65*e* and further vertically and horizontally inverted at the imaging lens 69, and it is in this state that the light image reaches the sub imaging device 7.

More specifically, as can be seen in comparison with FIG. 4, in FIG. 5 the angle of the mirror 65*e* has been changed (the angle thereof as to the camera main unit 2) has been changed. Specifically, the mirror 65*e* has turned on an axis AX1 a the lower end side thereof by a predetermined angle α in the direction of an arrow AR1, from the state shown in FIG. 4. Note that the mirror 65*e* is capable of being driven so as to turn on the axis AX1 in accordance with operations of the display switchover switch 18. The central control unit 101 determines whether to perform composition determining operations using the optical viewfinder or to perform composition determining operations using the electronic viewfinder, based on detection results of an angle detector (not shown) for detecting the angle of the mirror 65*e* as to the axis AX1. More specifically, in the case of the mirror 65*e* assuming the angle shown in FIG. 4 (also called "normal angle"), the central control unit 101 determines to perform composition determining operations using the optical viewfinder, and performs processing to stop supply of power to the sub imaging device 7, turn off the display on the back monitor 12, and so forth. On the other hand, in the case of the mirror 65*e* assuming the angle shown in FIG. 5 (also called "changed angle"), the central control unit 101 determines to perform composition determining operations using the electronic viewfinder, and performs processing to supply power to the sub imaging device 7, turn on the display on the back monitor 12, and so forth.

Thus, changing the attitude of the mirror 65e changes the optical path of the light reflected off of the mirror 65e, thereby changing the path of reflected light form the mirror 65e. Specifically, the incident angle θ1 as to the mirror 65e is relatively smaller than that of the state in FIG. 4, and the reflection angle θ2 thereof is also relatively smaller (see FIG. 5). Consequently, the reflected light from the mirror 65e changes the path thereof from the optical path heading toward the eyepiece lens 67 to a path toward the roof mirror 65a and 65b, such that the light passes through the imaging lens 69 and reaches the sub imaging device 7. Note that the imaging lens 69 and sub imaging device 7 are disposed above the eyepiece lens 67, at a position so as to not interrupt the optical path from the mirror 65e to the eyepiece lens 67 in the case of using the OVF.

Also, the path of the light reflected off of the mirror 65e is changed by an angle β (2×α), which is twice the change angle α of the mirror 65e. In other words, in order to change the angle of the optical path by an angle β, the mirror 65e only needs to be turned by an angle α which is half of the angle β. Also, the mirror 65e and the sub imaging device 7 are situated at a relatively great distance, so changing the turning angle of the mirror 65e only slightly enables two paths of reflected light from the mirror 65e to be accurately guided to the eyepiece lens 67 and the sub imaging device 7, which are away from each other. That is to say, the light flux of reflected light from the mirror 65e can be selectively sent along either of the two optical paths, by changing the turning angle of the mirror 65e but a little. Accordingly, space required for turning of the mirror 65e can be minimized.

Thus, the imaging lens 69 and the sub imaging device 7 are positioned so as to be able to receive a subject image which has passed through the focusing plate 63, on the optical path KB which shares at least a part of the optical path KA of the finder optical system. The sub imaging device 7 generates a live view image based on the subject image which has been reflected off of the mirror 65e, passed through the imaging lens 69, and reached the sub imaging device 7. Specifically, multiple images are sequentially generated at minute time (e.g., 1/60 second) intervals. The acquired time-sequence images are sequentially displayed on the back monitor 12. thus, the photographer can visually recognize the moving image (live view image) displayed on the back monitor 12, and can compose the picture using the moving images.

Note that the subject image reaching the sub imaging device 7 has the line image Gv drawn on the focusing plate 63 superimposed thereupon, so the sub imaging device 7 acquires the photographed image with the line image Gv superimposed thereupon. In this case as well, AF actions are realized using the light input to the AF module 20 by the main mirror 61 and sub mirror 62, as with the case of composition determining operations using the optical viewfinder.

Operations

Figure 7:
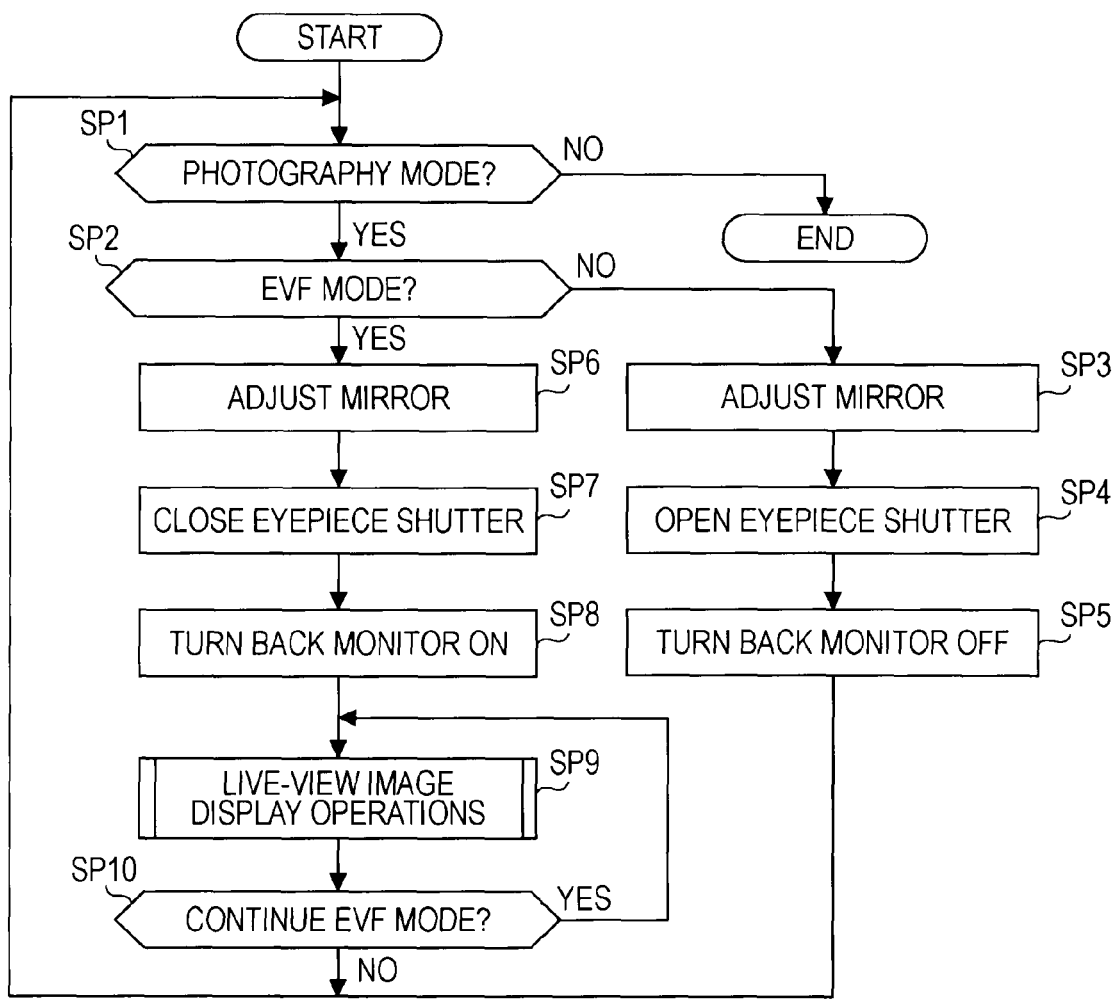
FIG. 7 is a flowchart illustrating operations relating to determining of composition with the imaging apparatus.

Next, description will be made regarding the operations for composition determining with the imaging apparatus 1. FIG. 7 is a flowchart illustrating the operations relating to composition determining with the imaging apparatus 1.

Upon the power of the imaging apparatus 1 being turned on by operations of the main switch 81, in SP1 shown in FIG. 7, determination is made regarding whether or not the photography mode has been selected. In the event that the photography mode has not been selected, photography operations including composition determining are ended, and in the event that the photography mode has been selected, the flow proceeds to step SP2.

In step SP2, determination is made regarding whether or not the EVF mode has been selected. In the event that determination is made regarding that the EVF mode has not been selected (i.e., the OVF mode has been selected by operations of the display switchover switch 18 and eyepiece detection) the flow proceeds to step SP3, and composition determining operations relating to the OVF mode (steps SP3 through SP5) are executed.

Specifically, in step SP3, the angle of the mirror 65e is adjusted, so that the angle thereof is the normal angle, and in step SP4, an eyepiece shutter 68 is set to an opened state. Thus, the subject image which has passed through the photography optical system is guided to the viewfinder window 10 along the optical path KA (the dotted line in FIG. 4). In step SP5, supply of power to the back monitor 12 is stopped.

Due to such composition determining operations relating to the OVF mode (steps SP3 through SP5), the photographer can visually recognize the subject via the viewfinder window 10.

On the other hand, the event that determination is made in step SP2 that the EVF mode has been selected, the flow proceeds to step SP6, and composition determining operations relating to the EVF mode (steps SP6 through SP10) are executed.

Specifically, in step SP6, the angle of the mirror 65e is adjusted, so that the angle thereof is the changed angle, and in step SP7, the eyepiece shutter 68 is set to a closed state. In step SP8, power is supplied to the back monitor 12. In step SP9, a live view image relating to the subject image is acquired by the sub imaging device 7, and operations for displaying the live view image on the back monitor 12 are executed, details of which will be described later.

In step SP10, determination is made regarding whether or not to continue the EVF mode. In detail, in the event that the EVF mode is maintained in the photography mode, the flow proceeds to step SP9, while in the event that the photography mode has been cancelled or the OVF mode has been selected, the flow proceeds to step SP10.

Such composition determining operations regarding the EVF mode enable the photographer to visually recognize a live view image relating to the subject image, on the back monitor 12.

Figure 8:
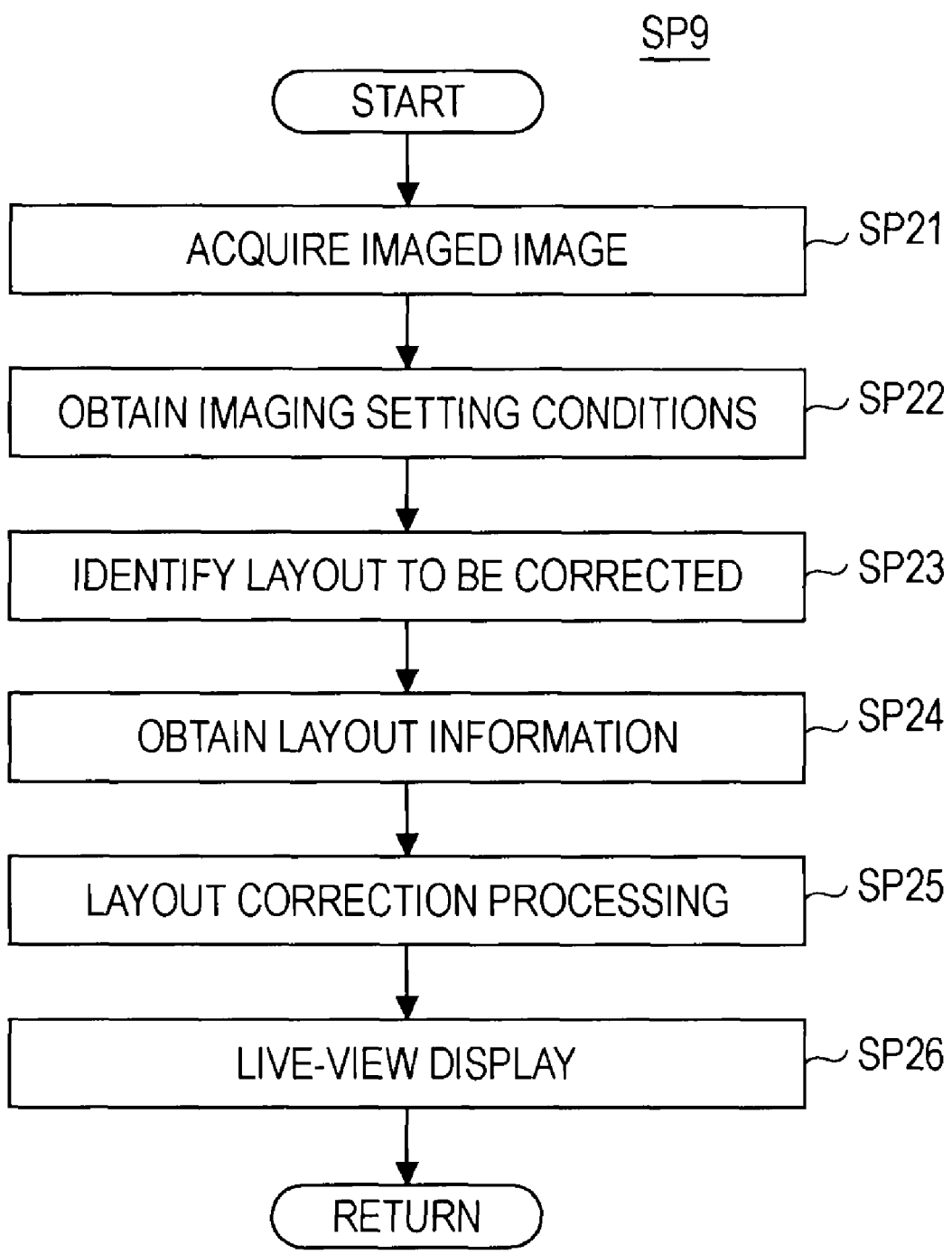
FIG. 8 is a flowchart relating to display operations of a live view image.

Now, the display operations of a live view image in step SP9 will be described in detail. FIG. 8 is a flowchart relating to the display operations of the live view image, and FIG. 9 is a diagram illustrating the relation between photography conditions and the individual layout lines. FIG. 10 is a diagram illustrating address information of each layout line.

Specifically, as shown in FIG. 8, in step SP21 a photographed image relating to the subject image is acquired by the sub imaging device 7.

In step SP22, photography conditions (also called "photography setting conditions" or "photography information") which the photographer has set with the central control unit 101 at the time of photography. In detail, setting information relating to focus (focus information) and/or setting information relating to exposure (exposure information) are acquired. Focus information includes, for example, information regarding which of the AF mode and MF mode has been selected (enabled) as the focus mode (also called "focus mode information"), and information regarding which of "center spot", "wide", and "local" have been selected (enabled) for the AF area pattern (also called "AF area selection information").

Also, examples of exposure information include information regarding which of AE mode and ME mode have been selected (enabled) for the exposure mode (also called "exposure mode information"), and which of division photometry, center-weighted average photometry, and spot photometry have been selected (enabled) for the photometry mode (also called "photometry mode information").

Next, in step SP23, layout lines to be corrected are identified based on the photography conditions acquired a the central control unit 101. With the present embodiment, layout lines which are useless to the photographer under the photography conditions set by the photographer (i.e., unrelated to the selected photography conditions) are identified as layout lines to be corrected, i.e., layout lines to be erased. Such layout lines to be erased are identified by referencing a data table wherein the layout lines and the photography conditions are correlated, as shown in FIG. 9, for example.

In detail, in the event that the MF mode is selected as the focus mode, the first layout lines L1 through L4 and second layout lines L11 through L18 and third layout line L19 are identified as layout lines which should be erased (not displayed). Note that the layout lines L51 (also called "fourth layout line") is a layout line relating to exposure, so is not subject to display/non-display regarding setting information relating to focus.

Also, in the event that the AF mode is selected as the focus mode and "center spot" is selected as the AF area pattern, the third layout line L19 is to be displayed, while the first layout lines L1 through L4 and second layout lines L11 through L18 are identified as layout lines which should be erased.

Further, in the event that the AF mode is selected as the focus mode and "wide" is selected as the AF area pattern, the first layout lines L1 through L4 and second layout lines L11 through L18 and the third layout line L19 are to be displayed, and there are no layout lines relating to focus which should be erased.

Moreover, in the event that the AF mode is selected as the focus mode and "local" is selected as the AF area pattern, the first layout lines L1 through L4 are identified as layout lines which should be erased. Following the photographer selectively specifying one of the second layout lines L11 through L18 and the third layout line L19 as an AF area, all other layout lines other than the specified layout line are identified as layout lines which should be erased.

As for the fourth layout line L51 relating to exposure, in the event that the ME mode has been selected as the exposure mode, or in the event that the AE mode has been selected and also division photometry or center-weighted average photometry have been selected as the photometry mode, the fourth layout line L51 is identified as a layout line which should be erased. On the other hand, in the event that the AE mode has been selected and spot photometry has been selected as the photometry mode, the fourth layout line L51 is to be displayed.

Thus, in step SP23, a part of the line image shown superimposed on the photographed image is identified as layout lines to be erased, based on the acquired photography conditions.

In the subsequent step SP24, information layout lines identified to be erased at the central control unit 101 (also called "identified layout lines") is obtained. Specifically, position information of pixels making up the identified layout lines on the photographed image acquired with the sub imaging device 7 are acquired. These pixels are also called "line image configuration pixels" or simply "configuration pixels", and the position information is also called "address information". The address information is acquired by referring a data table wherein the layout lines and address information (more specifically, the coordinates of each of the pixels making of each of the layout lines) are correlated, as shown in FIG. 10.

In step SP25, the interpolation processing circuit 55 corrects the identified layout lines shown in the photographed image that has been acquired at the sub imaging device 7. Specifically, image processing for erasing the identified layout lines is performed by changing the pixel values of the line image configuration pixels making up the identified layout lines in the photographed image. More specifically, processing is executed wherein pixel values calculated by interpolation using pixel values of pixels existing nearby the line image configuration pixels (neighboring pixels) are taken as pixel values of the line image configuration pixels.

Figure 11:
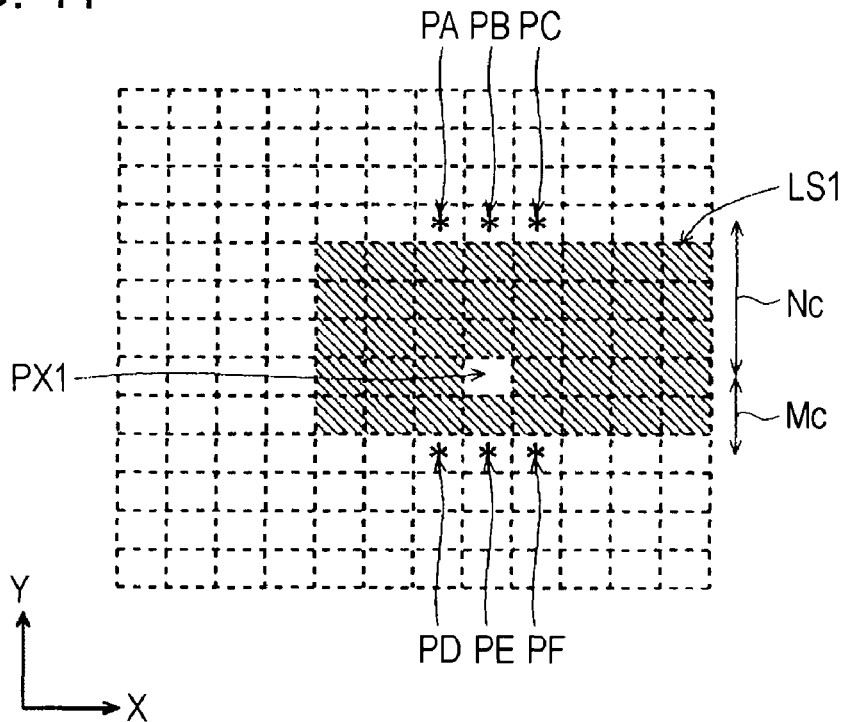
FIG. 11 is a diagram illustrating a partial region of a photography image with layout lines displayed.
Figure 12:
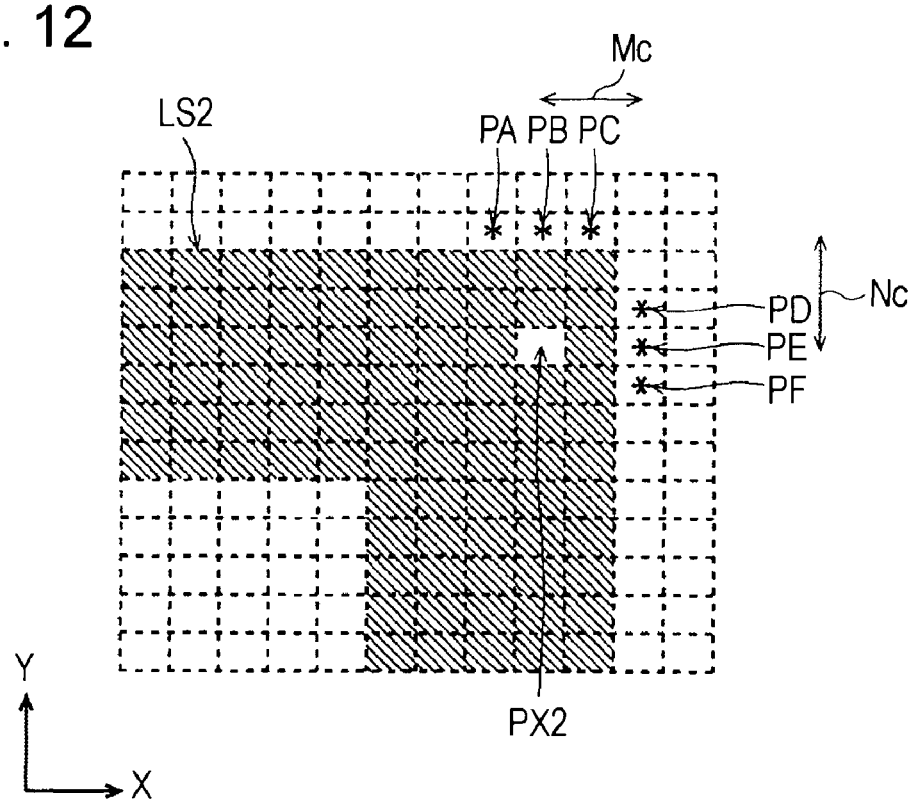
FIG. 12 is a diagram illustrating a partial region of a photography image with layout lines displayed.

Examples of interpolation techniques which can be used include the following. FIGS. 11 and 12 are diagrams illustrating a partial region of a photographed image in which a layout line is shown.

One arrangement is to store the layout lines beforehand in ROM or the like in the central control unit 101 with the direction in which the layout lines extend as the layout line direction, and to perform interpolation processing using pixel values of neighboring pixels existing in the direction perpendicular to the layout line direction of the layout line to which line image configuration pixels belong, based on the line image configuration pixels to be corrected.

For example, let us consider a case of calculating the pixel values of a line image configuration pixel PX1 making up a part of an identified layout line LS1, as shown in FIG. 11. In this case, there are identified six pixels PA, PB, PC, PD, PE, and PF, as neighboring pixels existing in directions (+Y direction and −Y direction) perpendicular to the layout line direction (X axial direction in this case). These six pixels are marked by asterisks in FIG. 11. The pixel values of the color components R (red), G (green), and B (blue) of the six neighboring pixels PA, PB, PC, PD, PE, and PF are used to calculate the pixel values of the color components of the line image configuration pixel PX1.

More particularly, the pixel value PXr of the R component of the line image configuration pixel PX1 can be expressed as shown in Expression (1), using the R component pixel values PAr, PBr, PCr, PDr, PEr, and PFr of the six neighboring pixels PA, PB, PC, PD, PE, and PF.

$$PXr = PAr \cdot Wa + PBr \cdot Wb + PCr \cdot Wc + PDr \cdot Wd + PEr \cdot We + PFr \cdot Wf \quad (1)$$

In Expression 1, Wa, Wb, Wc, Wd, We, Wf represent weighting coefficients, calculated based on an inter-center distance Nc between the line image configuration pixel PX1 and the neighboring pixel PB ("4" in this case (a distance corresponding to 1 pixel is calculated as "1")), and an inter-center distance Mc between the line image configuration pixel PX1 and the neighboring pixel PE ("2" in this case). The weighting coefficients Wa, Wb, Wc, Wd, We, and Wf are expressed as shown in Expressions (2) through (7), for example.

$$Wa = \frac{Mc}{Nc + Mc} \times \frac{1}{8} \quad (2)$$

$$Wb = \frac{Mc}{Nc + Mc} \times \frac{1}{4} \quad (3)$$

$$Wc = \frac{Mc}{Nc + Mc} \times \frac{1}{8} \quad (4)$$

$$Wd = \frac{Nc}{Nc + Mc} \times \frac{1}{8} \quad (5)$$

$$We = \frac{Nc}{Nc + Mc} \times \frac{1}{4} \quad (6)$$

$$Wf = \frac{Nc}{Nc + Mc} \times \frac{1}{8} \quad (7)$$

In the same way, the pixel value PXg of the G component of the line image configuration pixel PX1 can be expressed as shown in Expression (8), using the G component pixel values PAg, PBg, PCg, PDg, PEg, and PFg of the six neighboring pixels PA, PB, PC, PD, PE, and PF.

$$PXg = PAg \cdot Wa + PBg \cdot Wb + PCg \cdot Wc + PDg \cdot Wd + PEg \cdot We + PFg \cdot Wf \quad (8)$$

In the same way again, the pixel value PXb of the B component of the line image configuration pixel PX1 can be expressed as shown in Expression (9), using the B component pixel values PAb, PBb, PCb, PDb, PEb, and PFb of the six neighboring pixels PA, PB, PC, PD, PE, and PF.

$$PXb = PAb \cdot Wa + PBb \cdot Wb + PCb \cdot Wc + PDb \cdot Wd + PEb \cdot We + PFb \cdot Wf \quad (9)$$

Also, in the case of calculating the pixel values of a line image configuration pixel PX2 which exists at a crook portion of an L-shaped identified layout line LS2, as shown in FIG. 12, there are identified six pixels PA, PB, PC, PD, PE, and PF, closest in order to the line image configuration pixel PX2, as neighboring pixels. The pixel values of the color components R (red), G (green), and B (blue) of the six neighboring pixels PA, PB, PC, PD, PE, and PF are used to calculate the pixel values of the color components of the line image configuration pixel PX2. Calculation of the pixel values of the color components of the line image configuration pixel PX2 can be performed by techniques the same as those in the above Expressions (1), (8), and (9).

Thus, in step SP25, layout line correction processing is performed wherein pixel values (interpolated pixel values) of the line image configuration pixels are calculated by interpolation using pixel values of neighboring pixels existing nearby the line image configuration pixels, and the pixel values of the line image configuration pixels are replaced by the interpolated pixel values.

In the following step SP 26, a photographed image wherein image processing for erasing identified layout lines that are unnecessary is displayed on the back monitor 12 as a live view image. FIGS. 13 through 17 show various ways in which layout lines are displayed on the back monitor 12. Note that the dotted lines in FIGS. 13 through 17 indicate where the layout lines have been erased (not displayed).

Figure 13:
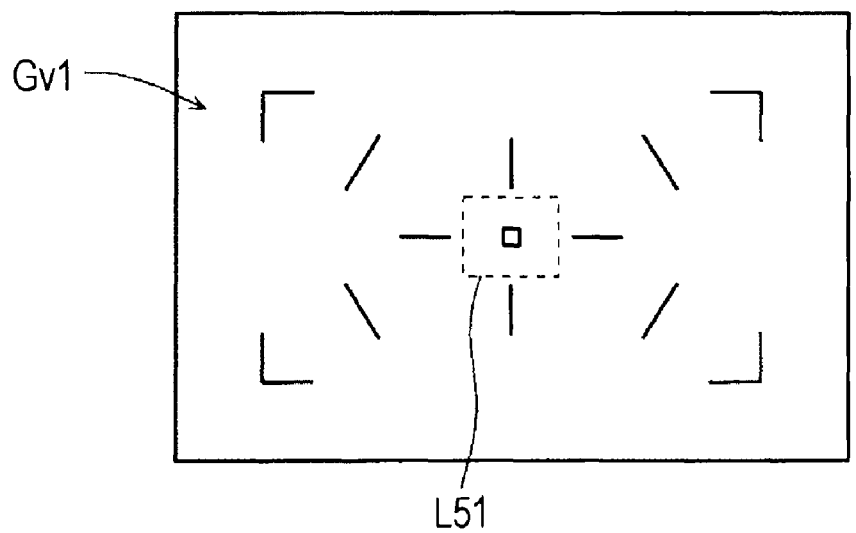
FIG. 13 is a diagram illustrating a form of layout lines displayed on a back monitor.

For example, in a case wherein "wide" has been selected as the AF area selection pattern in a state wherein the AF mode has been selected as the focus mode, and division photometry (or center-weighted average photometry) has been selected as the photometry mode in a state wherein the AE mode has been selected as the exposure mode, a line image Gv1 wherein the fourth layout line L51 has been erased is displayed on the back monitor 12 (see FIG. 13).

Figure 14:
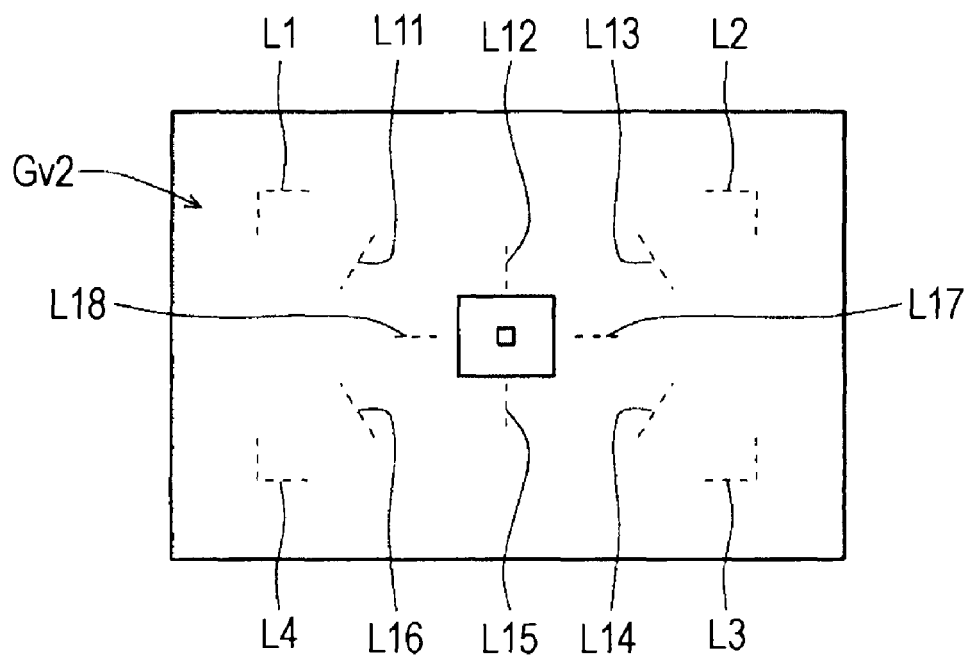
FIG. 14 is a diagram illustrating a form of layout lines displayed on a back monitor.

Also, in a case wherein "center spot" has been selected as the AF area selection pattern in a state wherein the AF mode has been selected as the focus mode, and spot photometry has been selected as the photometry mode in a state wherein the AE mode has been selected as the exposure mode, a line image Gv2 wherein the first layout lines L1 through L4 and the second layout lines L11 through L18 have been erased is displayed on the back monitor 12 (see FIG. 14).

Figure 15:
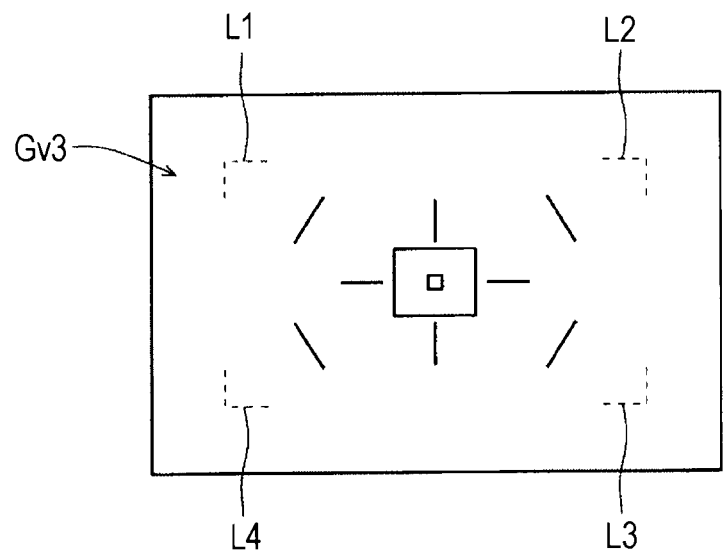
FIG. 15 is a diagram illustrating a form of layout lines displayed on a back monitor.
Figure 16:
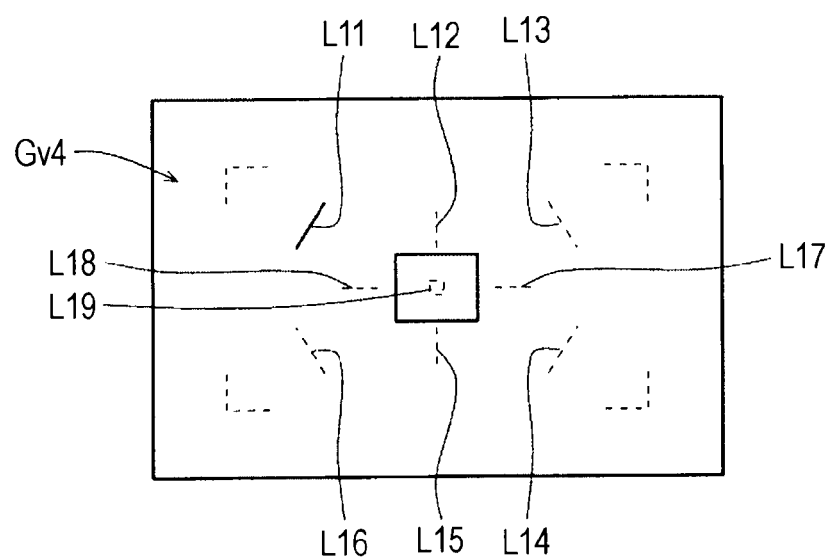
FIG. 16 is a diagram illustrating a form of layout lines displayed on a back monitor.

Also, in a case wherein "local" has been selected as the AF area selection pattern in a state wherein the AF mode has been selected as the focus mode, and spot photometry has been selected as the photometry mode in a state wherein the AE mode has been selected as the exposure mode, a line image Gv3 wherein the first layout lines L1 through L4 have been erased is displayed on the back monitor 12 (see FIG. 15). After the photographer has selected (specified) one of the second layout lines L11 through L18 and third layout line L19 to be the AF area, a line image layout lines other than the selected layout line have been erased is displayed on the back monitor 12. Specifically, in the event that the layout line L11 is selected as the AF area, a line image Gv4 wherein, of the second layout lines L11 through L18 and the third layout line 19, layout lines L12 through L19 which were not selected are erased, and the layout line which was specified (also called "specified layout line") L11 is displayed on the back monitor 12 (see FIG. 16).

Figure 17:
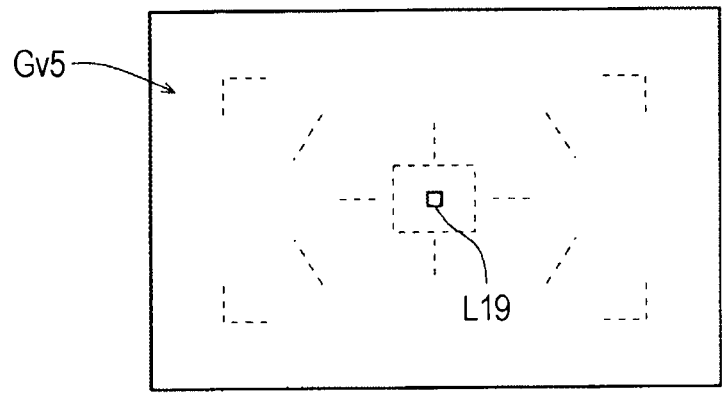
FIG. 17 is a diagram illustrating a form of layout lines displayed on a back monitor.

Also, in a case wherein the MF mode has been selected as the focus mode, the ME mode has been selected as the exposure mode, no line image is displayed on the back monitor 12, i.e., a display is made on the back monitor 12 wherein all layout lines (the first layout lines L1 through L4, the second layout lines L11 through L18, the third layout line L19, and the fourth layout line L51) have all been erased (see FIG. 17). Note that FIG. 17 shows a line image Gv5 in a state wherein the third layout line L19 is displayed. This enables the user to tell where the center position of the photography region is more easily.

Thus, the imaging apparatus 1 according to the present embodiment takes a line image shown in a photographed image acquired by the sub imaging device 7 and corrects a part of a line image extracted corresponding to photography conditions that have been set, whereby layout information useful under the photography conditions can be efficiently displayed, and visual recognition of the live view image improves.

MODIFICATIONS

While an embodiment of the present invention has been described, the present invention is by no way restricted to the above-described contents.

For example, while the above-described embodiment has been described as being arranged wherein layout lines to be erased are identified in step SP23 shown in FIG. 8 and these layout lines to be erased are erased from the live view photography image in step SP25, the present invention is not restricted to this arrangement, and other arrangements may be made. For example, an arrangement may be made wherein layout lines to be enhanced are identified in step SP23, and processing is performed wherein these layout lines are enhanced in the live view photography image in step SP25. More specifically, in step SP23, useful layout lines which the photographer should be able to visually recognize more readily, i.e., layout lines which correspond to the photography conditions set by the photographer, are identified as layout lines to be corrected, i.e., layout lines to be enhanced.

The layout lines to be enhanced can be identified using the data table shown in FIG. 9, and in a state wherein the AF mode is selected as the focus mode and "center spot" is selected as the AF area selection pattern, the third layout line L19 is to be displayed, so the third layout line L19 is identified as the layout line to be enhanced.

Then, in step SP24, the position information of the layout line identified to be enhanced (identified layout line), in the photographed image, is obtained.

In step SP25, image processing is performed wherein the pixel values of the pixels existing at the position where the layout line identified to be enhanced in the photographed image acquired by the sub imaging device 7 is shown are changed so as to be lower, thereby enhancing the identified layout lines. More specifically, the pixel values of the line image configuration pixels are changed to pixel values smaller than the original pixel values of the line image configuration pixels. For example, image processing is executed wherein the pixel values of all of the line image configuration pixels are changed to "0", thereby enhancing the identified pixel values.

In step SP26, a photographed image subjected to image processing for enhancing identified layout lines is displayed on the back monitor 12 as a live view image.

Thus, identified (partial) lines to be enhanced can be determined from among the line image displayed in the photographed image, based on the photography conditions, and the pixel values of the line image configuration pixels making up the identified layout lines can be changed so as to enhance the identified layout lines, whereby useful layout information can be clearly displayed on the back monitor 12.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus, comprising:
   a viewfinder optical system that observes a subject image input from a photography optical system;
   a transmissive member upon which is provided a line image indicating detection positions of photography supporting information relating to photography conditions, within a photography region, said photography conditions being at least one of setting information relating to a focus and setting information relating to an exposure;
   an imaging device that acquires a photographed image relating to said subject image, said line image having been superimposed on said photographed image; and
   line image correcting means for correcting a part of the line image extracted from said line image shown in said photographed image, said part of the line image having been extracted corresponding to said photography conditions that have been set.

2. The imaging apparatus according to claim 1, wherein said transmissive member is disposed upon an optical path of said viewfinder optical system,
   and said imaging device receives the subject image, which has passed through said transmissive member.

3. The imaging apparatus according to claim 1, wherein said line image correcting means comprises:
   determining means for determining said part of the line image, which is to be erased from said line image, based on said photography conditions; and
   image processing means for changing pixel values of configuration pixels configuring said part of the line image in said photographed image to erase said part of the line image.

4. The imaging apparatus according to claim 3, wherein said image processing means erases said part of the line image from said photographed image by subjecting said configuration pixels to an interpolation processing using pixel information of neighboring pixels existing nearby said part of the line image in said photographed image.

5. The imaging apparatus according to claim 4, wherein said neighboring pixels are pixels existing in a direction perpendicular to a direction in which a line configuring said part of the line image extends.

6. The imaging apparatus according to claim 1, wherein said line image correcting means comprises:
   determining means for determining said part of the line image, which is to be enhanced in said line image, based on said photography conditions; and
   image processing means for changing pixel values of configuration pixels configuring said part of the line image in said photographed image to enhance said part of the line image.

7. The imaging apparatus according to claim 6, wherein said line image correcting means changes said pixel values such that a brightness thereof is lower, thereby enhancing said part of the line image.

8. The imaging apparatus according to claim 1, wherein said photography conditions are setting information relating to a focus.

9. The imaging apparatus according to claim 8, wherein the setting information relating to the focus is information regarding which of an auto focus mode and a manual focus mode has been selected as a focus mode, and the line image correcting means corrects the part of the line image based on which of the auto focus mode and the manual focus mode has been selected as the focus mode.

10. The imaging apparatus according to claim 8, wherein the setting information relating to the focus is information regarding which of a center spot pattern, a wide pattern, and a local pattern has been selected for an auto focus mode area pattern, and the line image correcting means corrects the part of the line image based on which of the center spot pattern, the wide pattern, and the local pattern has been selected for the auto focus mode area pattern.

11. The imaging apparatus according to claim 1, wherein said photography conditions are setting information relating to an exposure.

12. The imaging apparatus according to claim 11, wherein the setting information relating to the exposure is information regarding which of an automatic exposure mode and a manual exposure mode has been selected for an exposure mode, and the line image correcting means corrects the part of the line image based on which of the automatic exposure mode and the manual exposure mode has been selected for the exposure mode.

13. The imaging apparatus according to claim 11, wherein the setting information relating to the exposure is information regarding which of a division photometry, a center-weighted average photometry, and a spot photometry has been selected for a photometry mode, and the line image correcting means corrects the part of the line image based on which of the division photometry, the center-weighted average photometry, and the spot photometry has been selected for the photometry mode.

14. The imaging apparatus according to claim 1, wherein said transmissive member is a focusing plate upon which said subject image is imaged.

15. The imaging apparatus according to claim 1, wherein said line image includes multiple lines corresponding to multiple photography conditions.

16. The imaging apparatus according to claim 1, wherein the line image correcting means corrects the part of the line image by enhancing the part of the line image upon a selection of an auto focus mode as a focus mode and a selection of a center spot pattern for an auto focus mode area pattern.

17. An imaging apparatus, comprising:
- a viewfinder optical system that observes a subject image input from a photography optical system;
- a transmissive member upon which is provided a line image indicating detection positions of photography supporting information relating to photography conditions, within a photography region, said photography conditions being at least one of setting information relating to a focus and setting information relating to an exposure;
- an imaging device that acquires a photographed image relating to said subject image, said line image having been superimposed on said photographed image; and
- a processing unit configured to correct a part of the line image extracted from said line image shown in said photographed image, said part of the line image having been extracted corresponding to said photography conditions that have been set.

18. A computer-readable storage medium encoded with computer executable instructions, wherein the instructions, when executed by a processing unit, cause the processing unit to:
- acquire a photographed image relating to a subject image input from a photography optical system, the subject image having been observed by a viewfinder optical system, a line image being superimposed on said photographed image, the line image having been provided upon a transmissive member and having indicated detection positions of photography supporting information relating to photography conditions, within a photography region, said photography conditions being at least one of setting information relating to a focus and setting information relating to an exposure; and
- correct a part of the line image extracted corresponding to said photography conditions.

* * * * *